(12) United States Patent
Taiga

(10) Patent No.: US 8,348,296 B2
(45) Date of Patent: Jan. 8, 2013

(54) ACCESSORY CONNECTION MEMBER FOR BICYCLES

(75) Inventor: Keiji Taiga, Tokyo (JP)

(73) Assignee: Crops Co., Ltd., Tokyo (JP)

( * ) Notice: Subject to any disclaimer, the term of this patent is extended or adjusted under 35 U.S.C. 154(b) by 0 days.

(21) Appl. No.: 13/103,184

(22) Filed: May 9, 2011

(65) Prior Publication Data

US 2012/0235380 A1    Sep. 20, 2012

(30) Foreign Application Priority Data

Mar. 16, 2011 (TW) .............................. 100204703 U

(51) Int. Cl.
*B62J 11/00* (2006.01)
(52) U.S. Cl. ...................... 280/288.4; 224/420; 362/474
(58) Field of Classification Search ............. 248/231.81, 248/316.1, 316.4, 316.6, 316.7; 224/420; 362/474; 16/DIG. 42; 280/288.4
See application file for complete search history.

(56) References Cited

U.S. PATENT DOCUMENTS

| | | | | |
|---|---|---|---|---|
| 4,477,865 A * | 10/1984 | Tsuyama | ...................... | 362/396 |
| 5,005,793 A * | 4/1991 | Shillington | .............. | 248/231.81 |
| 5,850,056 A * | 12/1998 | Harwath | .................... | 174/40 CC |
| 6,412,741 B1 * | 7/2002 | Olivero | .......................... | 248/313 |
| 6,561,206 B1 * | 5/2003 | Wilkinson | ....................... | 135/65 |
| 2006/0076462 A1 * | 4/2006 | Ceravalls Pujol et al. | ... | 248/67.7 |
| 2010/0200715 A1 * | 8/2010 | Kuipers | .................. | 248/221.11 |

* cited by examiner

*Primary Examiner* — Tony Winner
(74) *Attorney, Agent, or Firm* — Rosenberg, Klein & Lee

(57) ABSTRACT

A bicycle accessory connection member includes a base having a planar contact surface and a recessed and curved match surface. Two elongate fastening members extend two sides of the contact surface and toward the match surface. The body and the fastening members are made by resilient material. A space is defined through the base so that the part with the accessory rack or bag is inserted into the space and connected to the base. An S-shaped hook has two recesses defined in two ends thereof and the two fastening members are engaged with the two recesses respectively so as to firmly connect the body to the bicycle frame.

3 Claims, 12 Drawing Sheets

ACCESSORY CONNECTION MEMBER FOR BICYCLES

FIELD OF THE INVENTION

The present invention relates to an accessory connection member, and more particularly, to an accessory connection member fixed to the bicycle frame and connected with the accessory.

BACKGROUND OF THE INVENTION

A bicycle frame is composed of a head tube, a top tube, a down tube, a seat tube, two seat stays, two chain stays and a bottom bracket, there is no proper storage space for the bicycle frame. Therefore, the accessory racks or bags are developed so as to be connected to the bicycle frame.

The accessory racks or bags comprises bottle rack, seat bag, paddle bag, top tube bag, rear bag, and basket, and some specific bags are designed for receiving electronic products such as cellular phone bag, meter bag, navigation device bag, front light rack, rear light rack, warning rack and handlebar light rack.

These accessory racks or bags need proper connection units to be connected to the bicycle frame so that the users can easily and conveniently access the accessories.

The conventional connection units each generally includes a first part which is connected to the bicycle frame and a second part which is connected with the rack or bag, and the second part is connected to the first part as needed.

Taiwan Utility Model Patent No. 098220086 discloses a connection unit which includes a body having a connection portion at the bottom thereof and a locking portion is located on the rear end of the body. A collar whose two ends are connected to the body and a fixing member is connected to the locking portion. The body has two protrusions on the top thereof and each protrusion has a notch. The collar is a resilient member whose one end is engaged with the notch and the other end of the collar is fixed to the locking portion.

Taiwan Utility Model Patent No. 098222307 discloses a connection unit which includes a body having a first hook and a second hook on two sides thereof, and a recess is defined in the bottom of the body. A collar having at least two holes for being engaged with the two hooks. When the hooks are hooked with the holes of the collar, the space is defined between the body and the collar so as to receive an item which is located close to the inside of the recess.

The first example uses the collar with one end engaged with the notch and the other end of the collar fixed to the locking portion so as to adapt different sizes of the handlebars. The second example uses the holes of the collar to be engaged with the first and second hooks so define a space between the body and the collar to receive an item and the item is located close to the inside of the recess.

However, the two parts are complicated so that the two parts have to be prepared in pairs and other designs of the accessory racks or bags cannot be connected to the first part. Furthermore, the first part is locked to the bicycle frame by connecting the two ends of the two collar to the locking portion and the protrusions of the body, so that there are too many steps involved when installed to the bicycle frame or removed from the bicycle frame. The collar of the second example is easily disengaged from the body or dropped off.

The present invention intends to provide a bicycle accessory connection member which is connected to the bicycle frame and is easily connected with the part with the rack or bag.

SUMMARY OF THE INVENTION

The present invention relates to a bicycle accessory connection member and comprises a base having a planar contact surface and a recessed and curved match surface. The planar contact surface contacts the part with the accessory rack or bag and the match surface matches with the bicycle frame. Two elongate fastening members extend two sides of the contact surface and toward the match surface. The body and the fastening members are made by resilient material. A space is defined through the base so that the part with the accessory rack or bag is inserted into the space and connected to the base. An S-shaped hook has two recesses defined in two ends thereof and the two fastening members are engaged with the two recesses respectively so as to firmly connect the body to the bicycle frame.

The primary object of the present invention is to provide an accessory connection member which provides a space for any part with the accessory rack or back to be inserted therein.

Another object of the present invention is to provide an accessory connection member which is easily used and can be conveniently cooperated with existed accessory rack or bag.

Yet another object of the present invention is to provide an accessory connection member which provides two resilient fastening members which fasten the connection member to the bicycle frame of different sizes.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
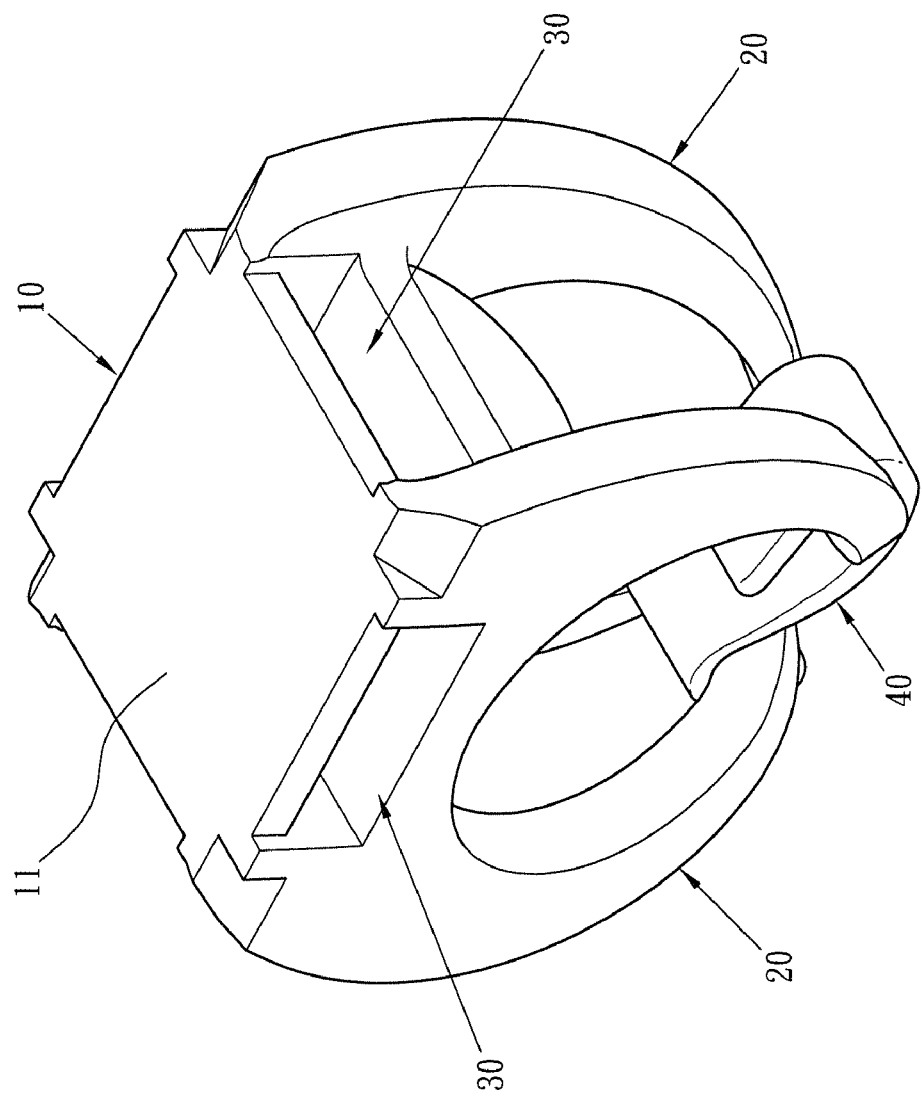
FIG. 1 is a perspective view to show the accessory connection member of the present invention.

Referring to FIGS. 1 to 5, the accessory connection member of the present invention comprises a base 10 having a planar contact surface 11 defined in one side thereof and a recessed and curved match surface 12 defined in the other side of the base 10. The planar contact surface 11 is to contact a part with accessory rack or bag, and the match surface 12 is to match with the bicycle frame 50 such as the handlebar 51 of the bicycle 50.

Two elongate fastening members 20 integrally extend two sides of the contact surface 11 and toward the match surface 12. The fastening members 20 are two enclosed collars and both of the body 10 and the fastening members 20 are made by resilient material.

A space 30 is defined through the base 10 so that the part with the accessory rack or bag can be inserted into the space 30.

An S-shaped hook 40 has two recesses 41, 42 defined in two ends thereof and is hooked to the two fastening members 20 by engaging two respective sections 21, 22 of the two fastening members 20 with the two recesses 41, 42 respectively.

By using the S-shaped hook 40, and the resilient base 10 and the fastening members 20, the connection member of the present invention can be securely mounted to any size of the bicycle frame and the existed part with the accessory rack or bag can easily and quickly connected to the connection member.

Figure 2:
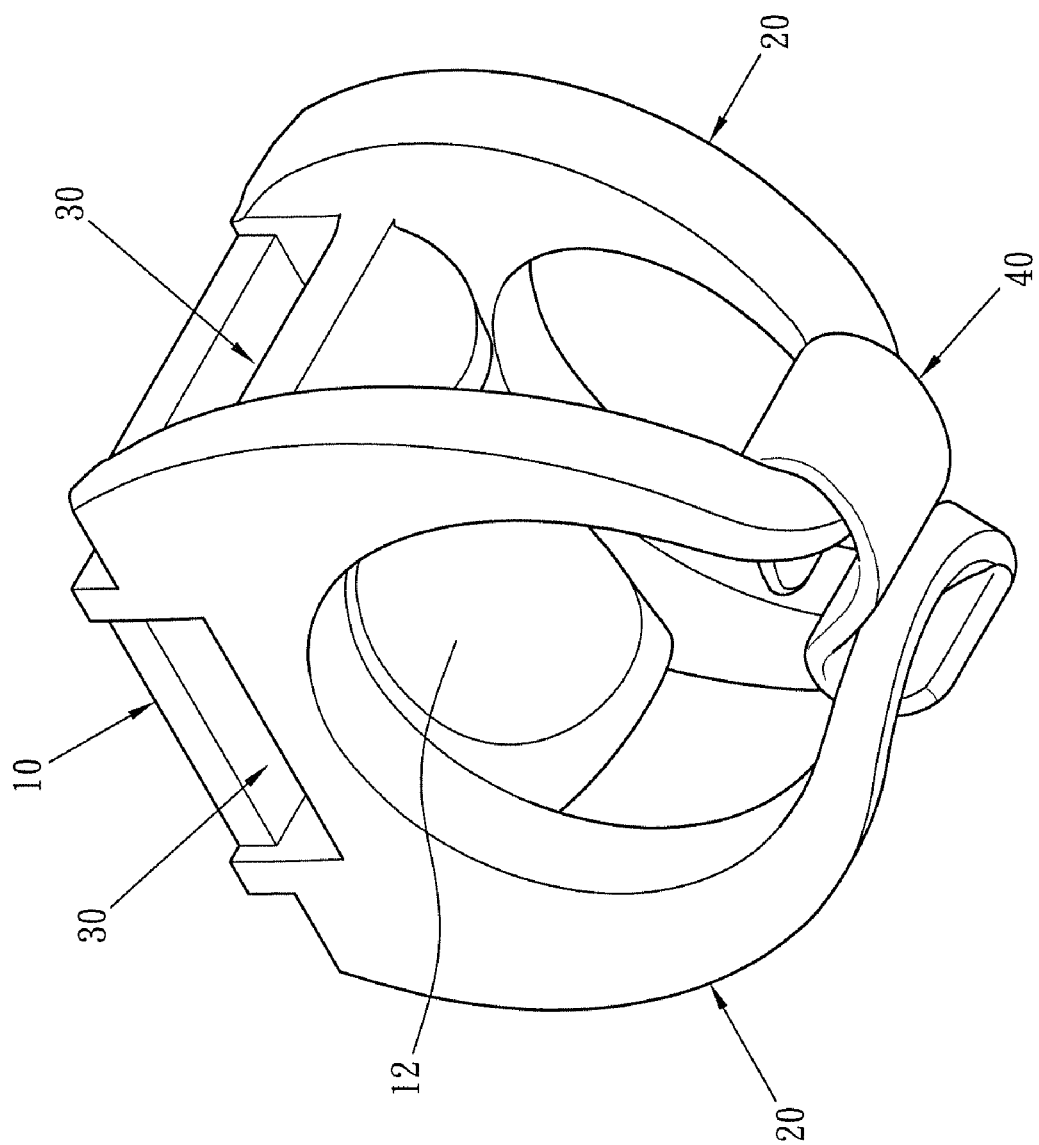
FIG. 2 is another perspective view to show the accessory connection member of the present invention.
Figure 3:
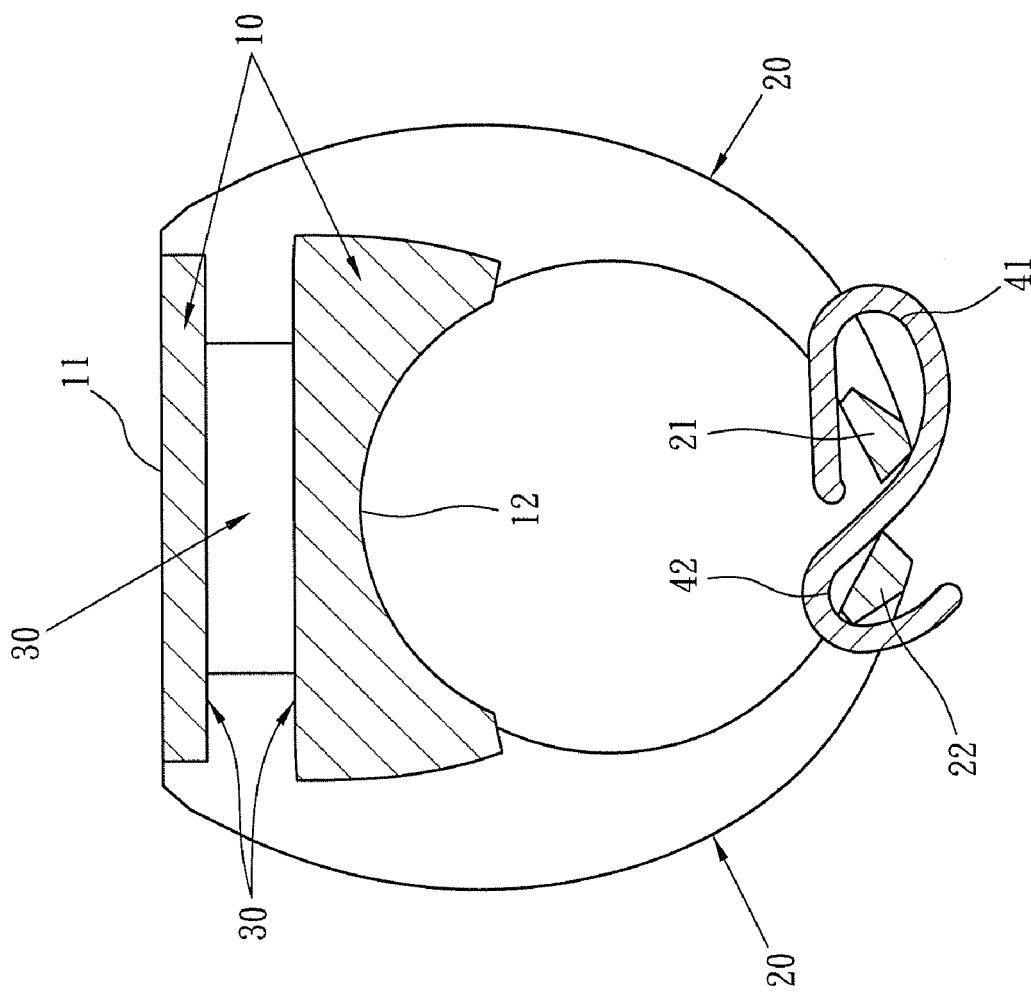
FIG. 3 is a cross sectional view of the accessory connection member of the present invention.
Figure 4:
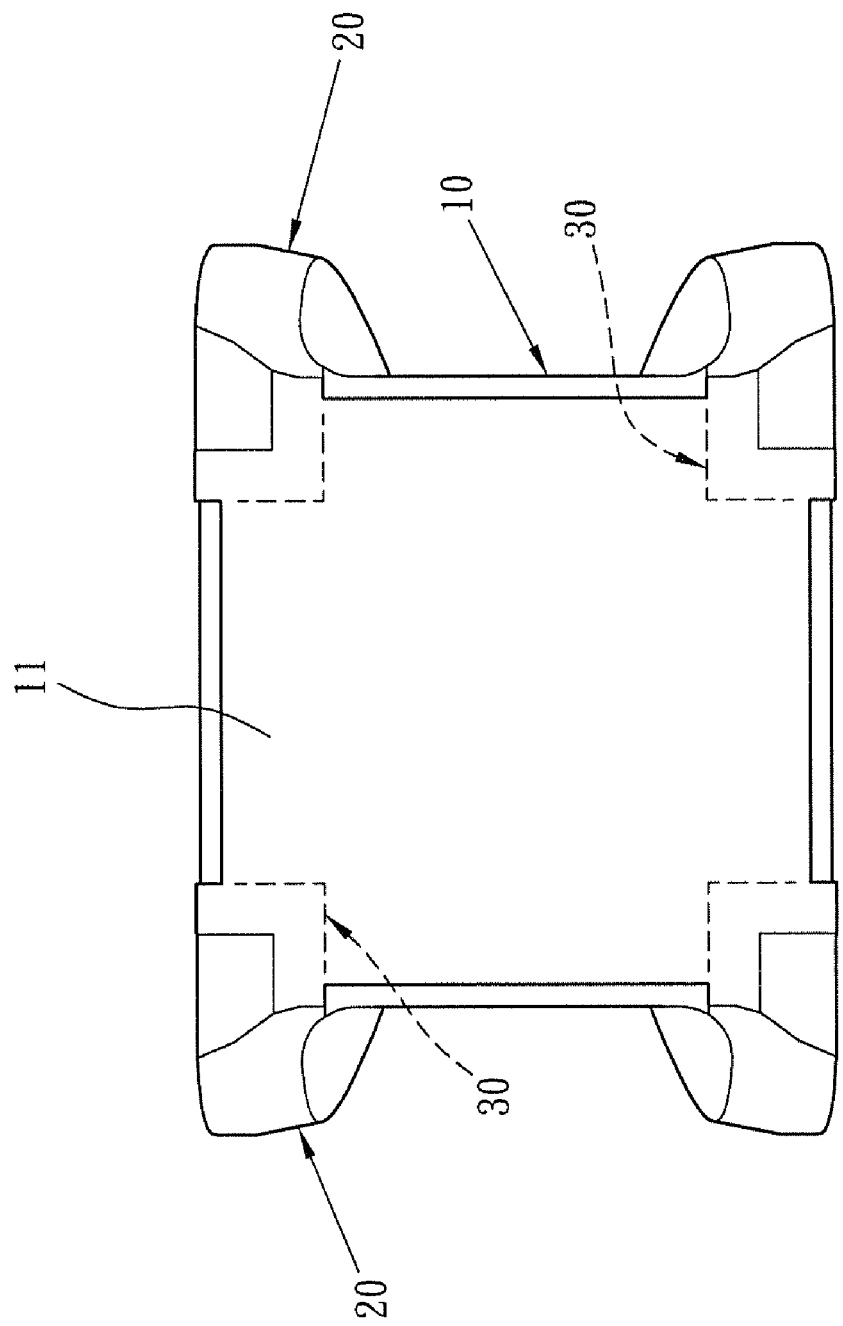
FIG. 4 is a bottom view of the accessory connection member of the present invention.
Figure 5:
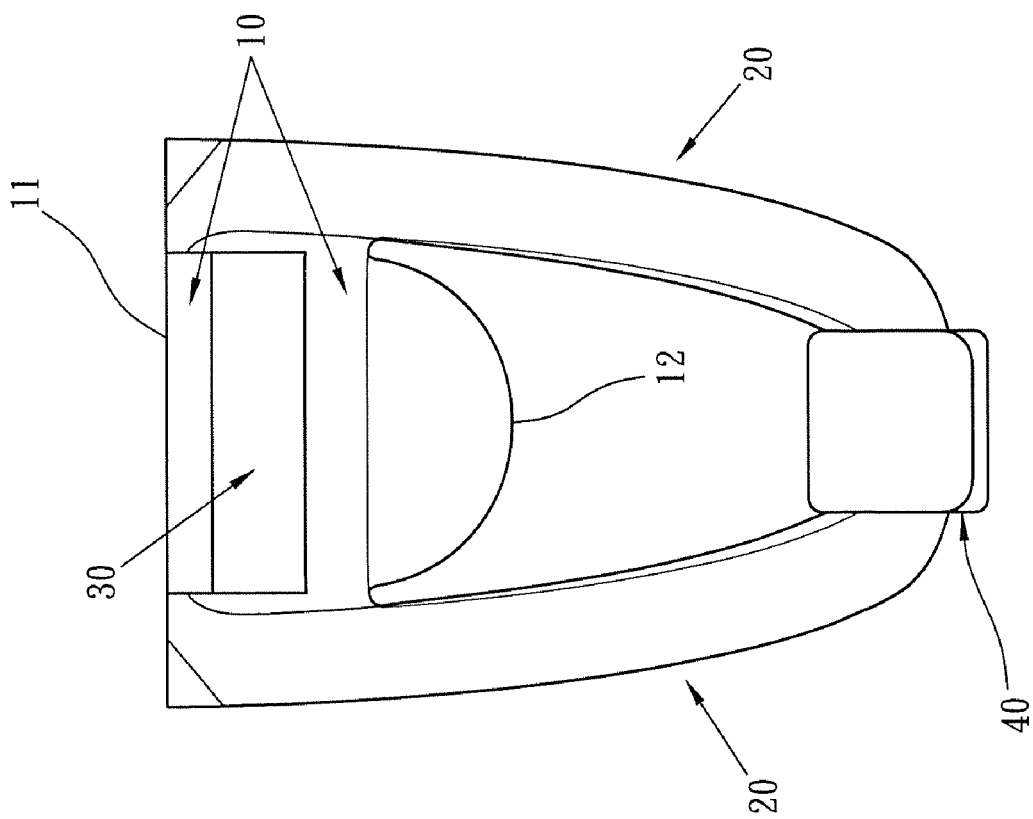
FIG. 5 is a side view of the accessory connection member of the present invention.
Figure 6:
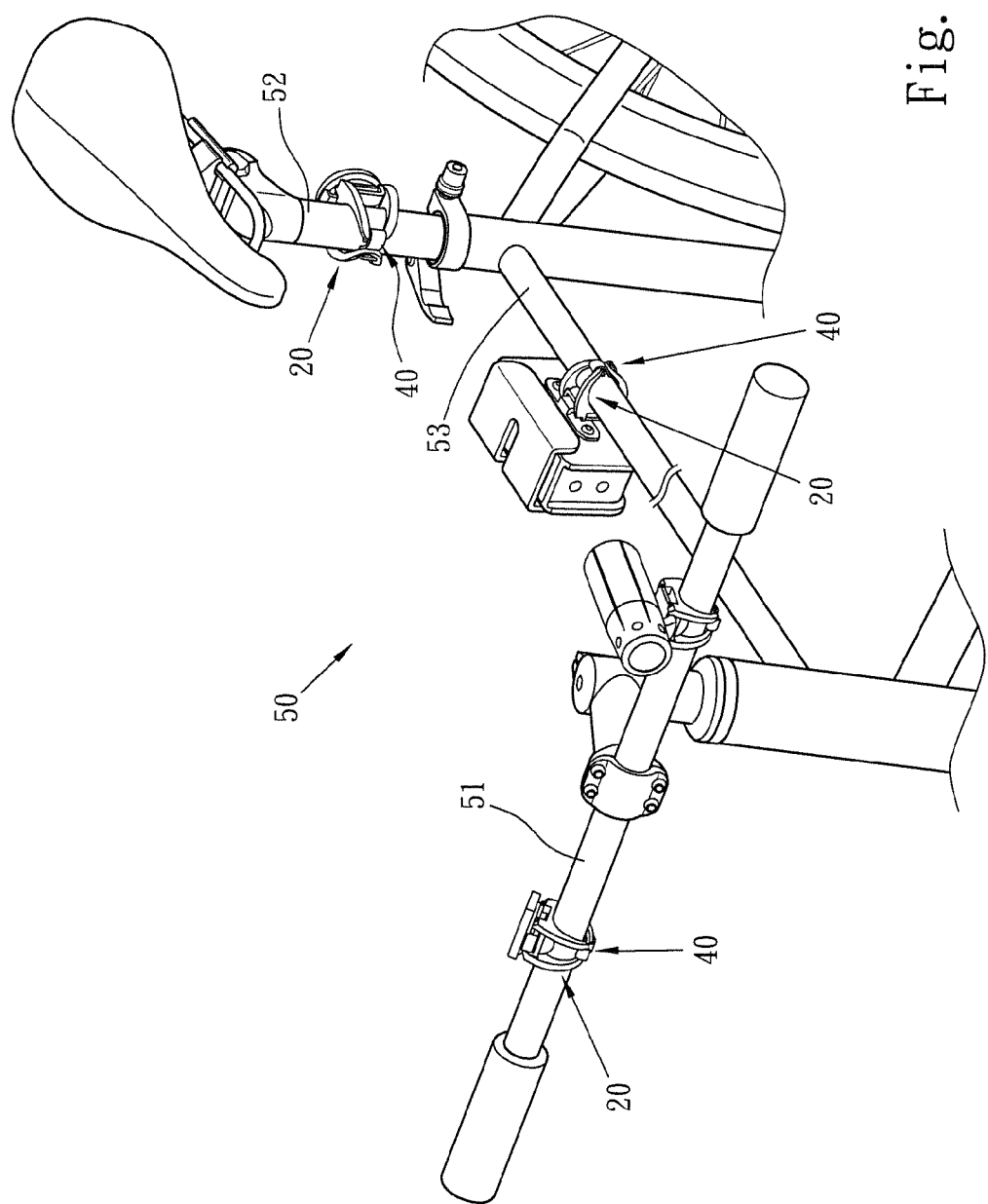
FIG. 6 shows that multiple accessory connection members of the present invention are connected to a bicycle frame.

The base 10 has a planar contact surface 11 and a recessed and curved match surface 12, two elongate fastening members 20 integrally extend two sides of the contact surface 11 and toward the match surface 12. A space 30 is defined through the base 10 as shown in FIG. 2. The space 30 is in a cross like passage as shown in FIG. 4 so that the part with the accessory rack or bag can conveniently connected to the base 10. The match surface 12 matches the curvature of the bicycle frame such as the handlebar 51, the seat tube 52 or the top tube 53.

Figure 7:
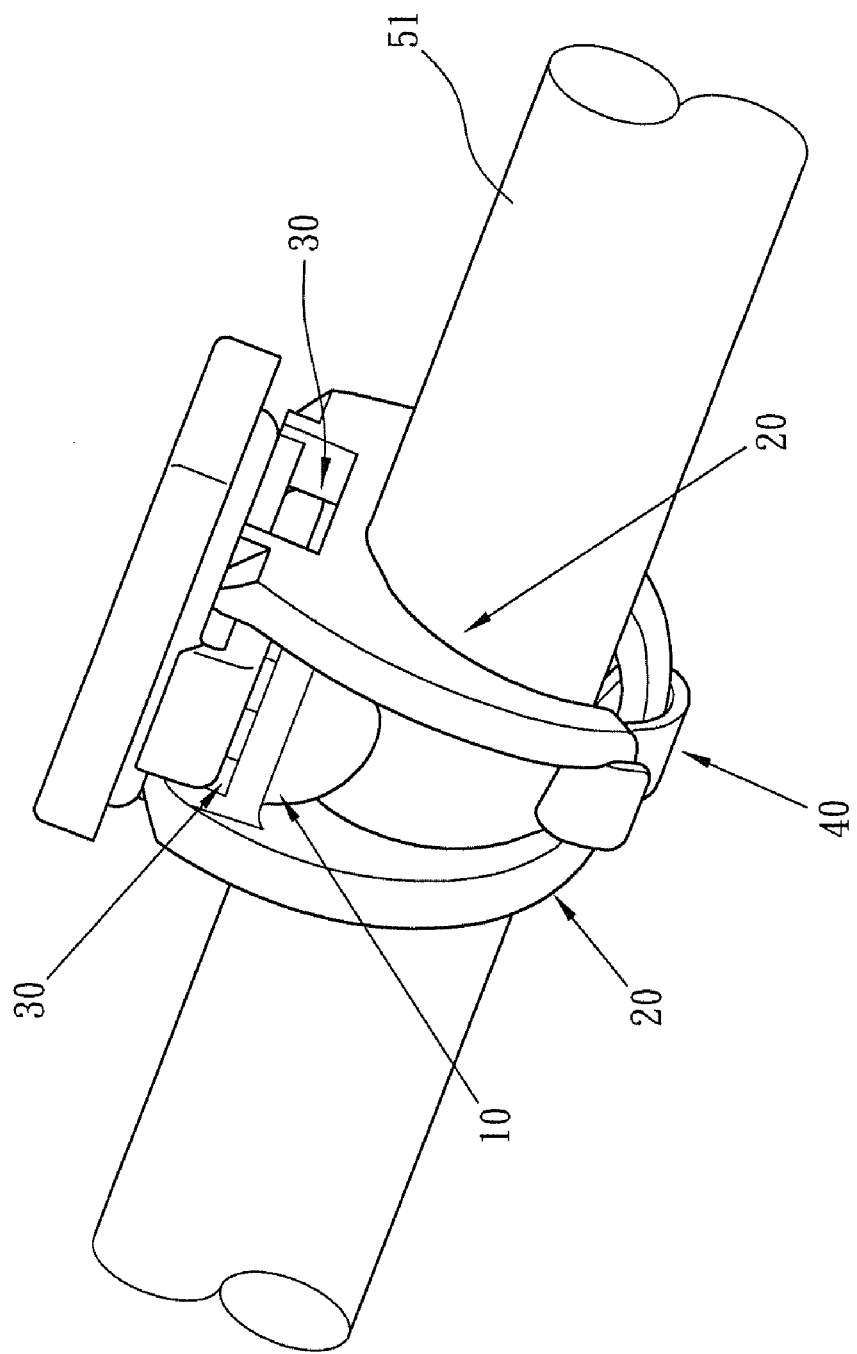
FIG. 7 shows that an accessory connection member of the present invention is connected to the handlebar of the bicycle frame.
Figure 8:
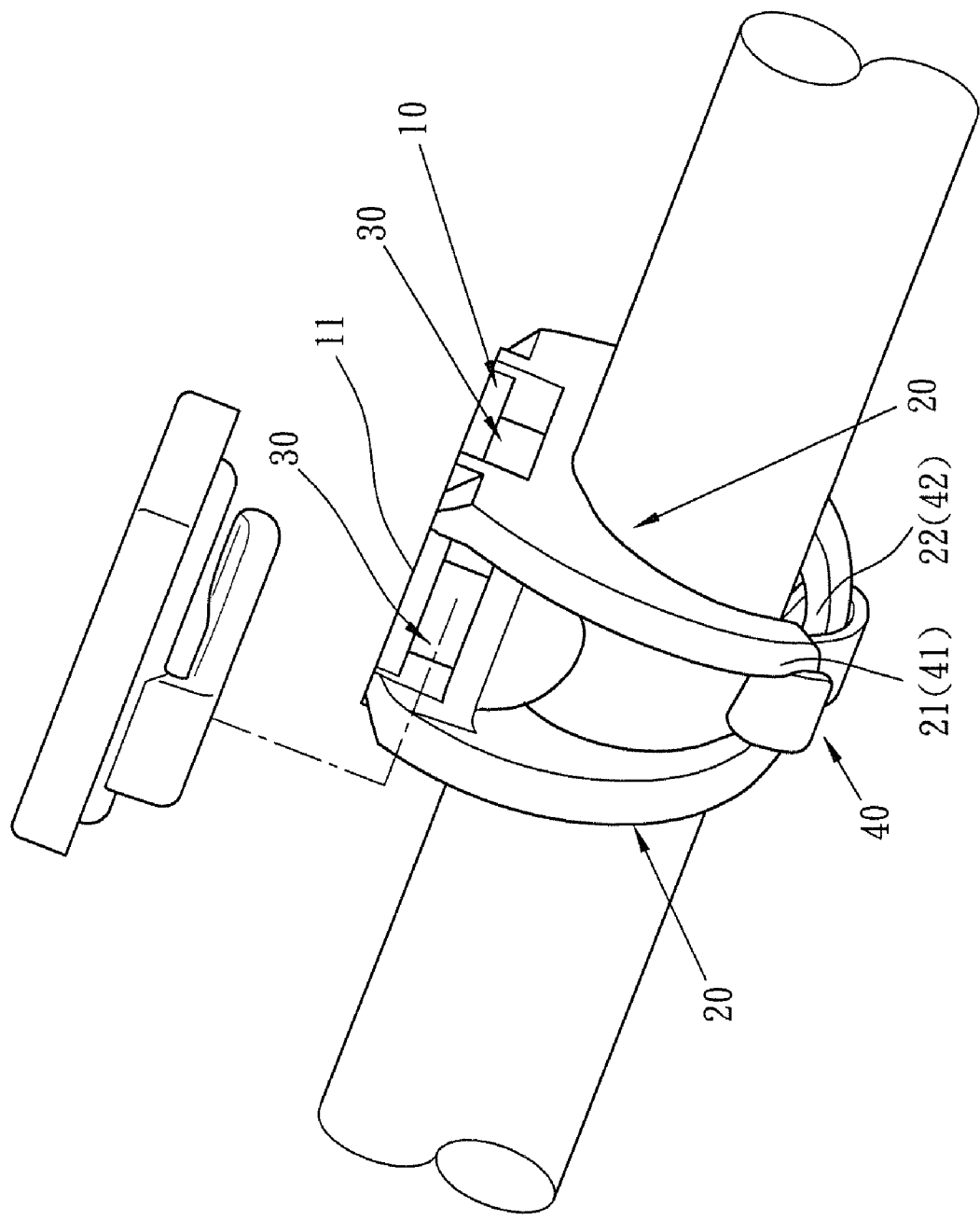
FIG. 8 is an exploded view to show that a part is to be connected to the base of the accessory connection member of the present invention.
Figure 9:
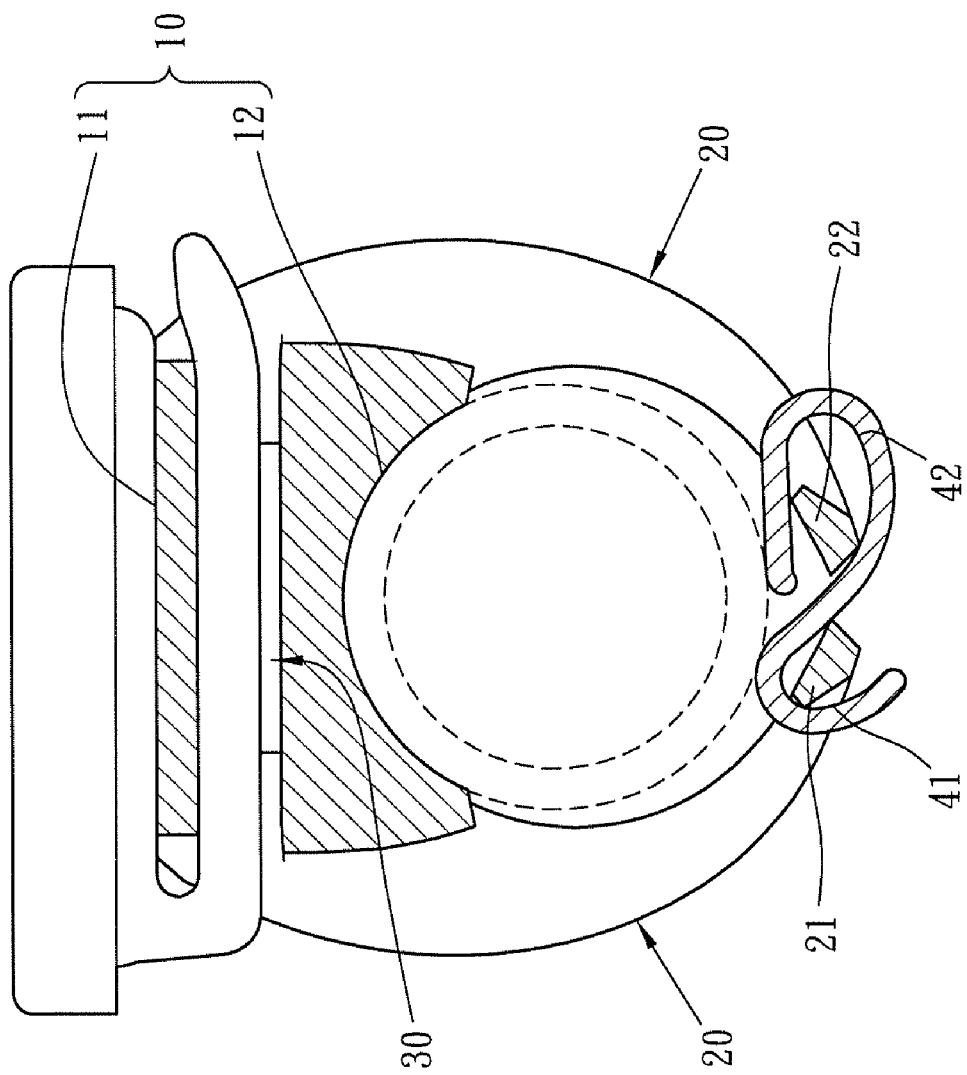
FIG. 9 is a cross sectional view of the connection shown in FIG. 8.

As shown in FIGS. 7 to 9, the connection member is used to connect a speed meter to the handlebar 51, the match surface 12 is first matched to the handlebar 51 and the two fastening members 20 are pulled and the S-shaped hook 40 hooks the two sections 21, 22 of the two fastening members 20 to secure the connection member to the handlebar 51. The part with the speed meter usually includes an L-shaped insertion which is then inserted into the space 30 to connect the speed meter to the handlebar 51.

The space 30 provides a convention connection to the part that has an L-shaped insertion which is easily inserted into the space 30 to connect the part with the accessory rack or bag to the connection member on the bicycle frame. Only one step is required to complete the connection.

The base 10 and the fastening members 20 are both made of resilient member so that they can be extended to match different sizes of the portions of the bicycle frame. No part jumps or drop out from the connection member and there is no complicated part involved.

Figure 10:
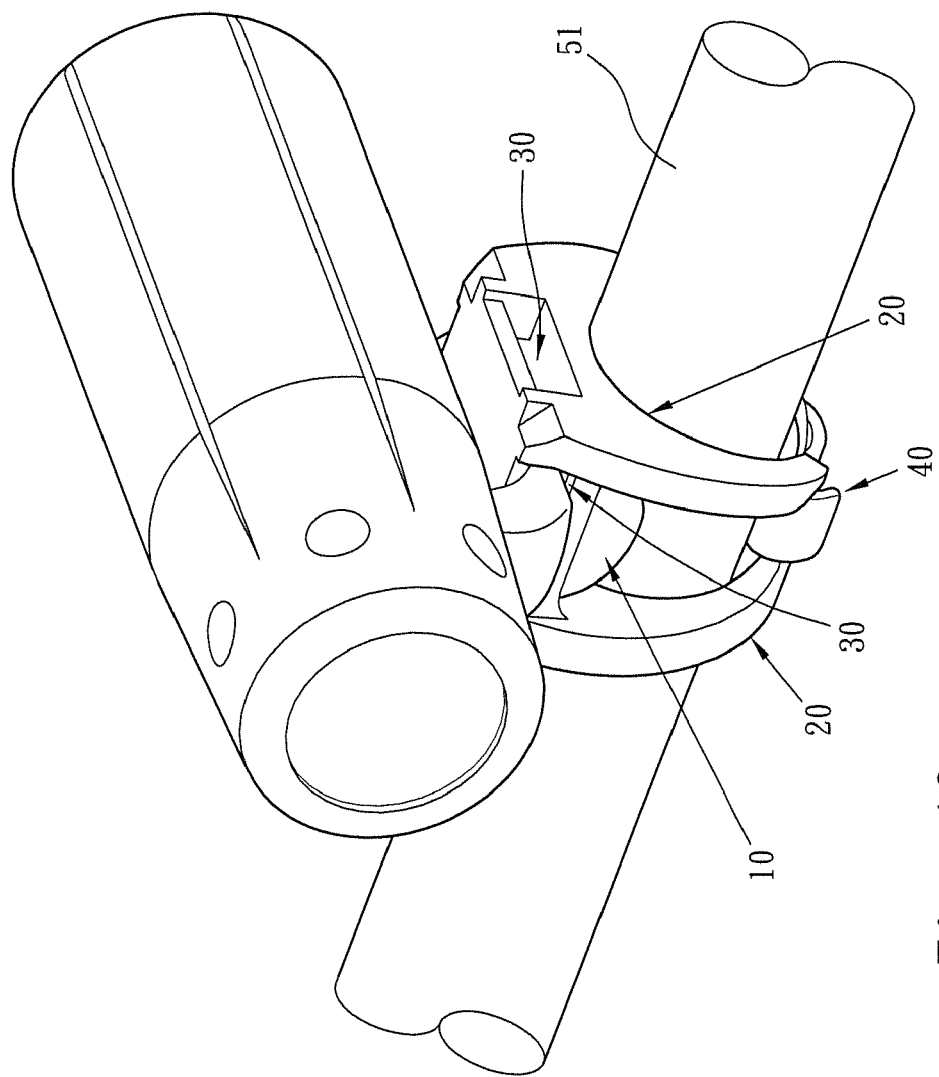
FIG. 10 shows that a light device is connected to the accessory connection member of the present invention on the handlebar of the bicycle frame.

As shown in FIG. 10, the connection member is used to connect a front light unit to the handlebar 51, the match surface 12 is first matched to the handlebar 51 and the two fastening members 20 are pulled and the S-shaped hook 40 hooks the two sections 21, 22 of the two fastening members 20 to secure the connection member to the handlebar 51. The part with the front light unit usually includes an L-shaped insertion which is then inserted into the space 30 to connect the speed meter to the handlebar 51.

Figure 11:
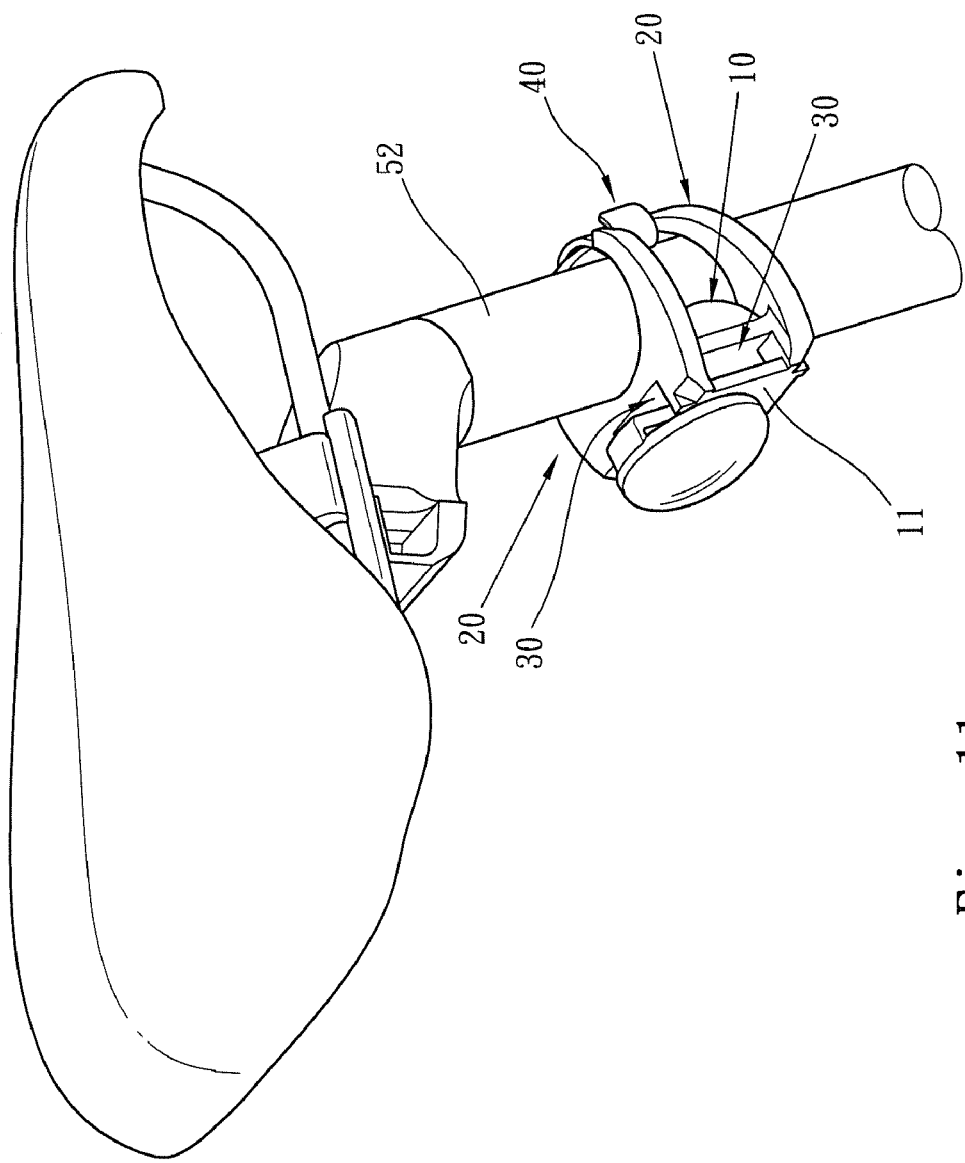
FIG. 11 shows that a reflector is connected to the accessory connection member of the present invention on the seat tube of the bicycle frame.

As shown in FIG. 11, the connection member is used to connect a rear light unit to the seat tube 52, the match surface 12 is first matched to the seat tube 52 and the two fastening members 20 are pulled and the S-shaped hook 40 hooks the two sections 21, 22 of the two fastening members 20 to secure the connection member to the seat tube 52. The part with the rear light unit usually includes an L-shaped insertion which is then inserted into the space 30 to connect the speed meter to the handlebar 51.

Figure 12:
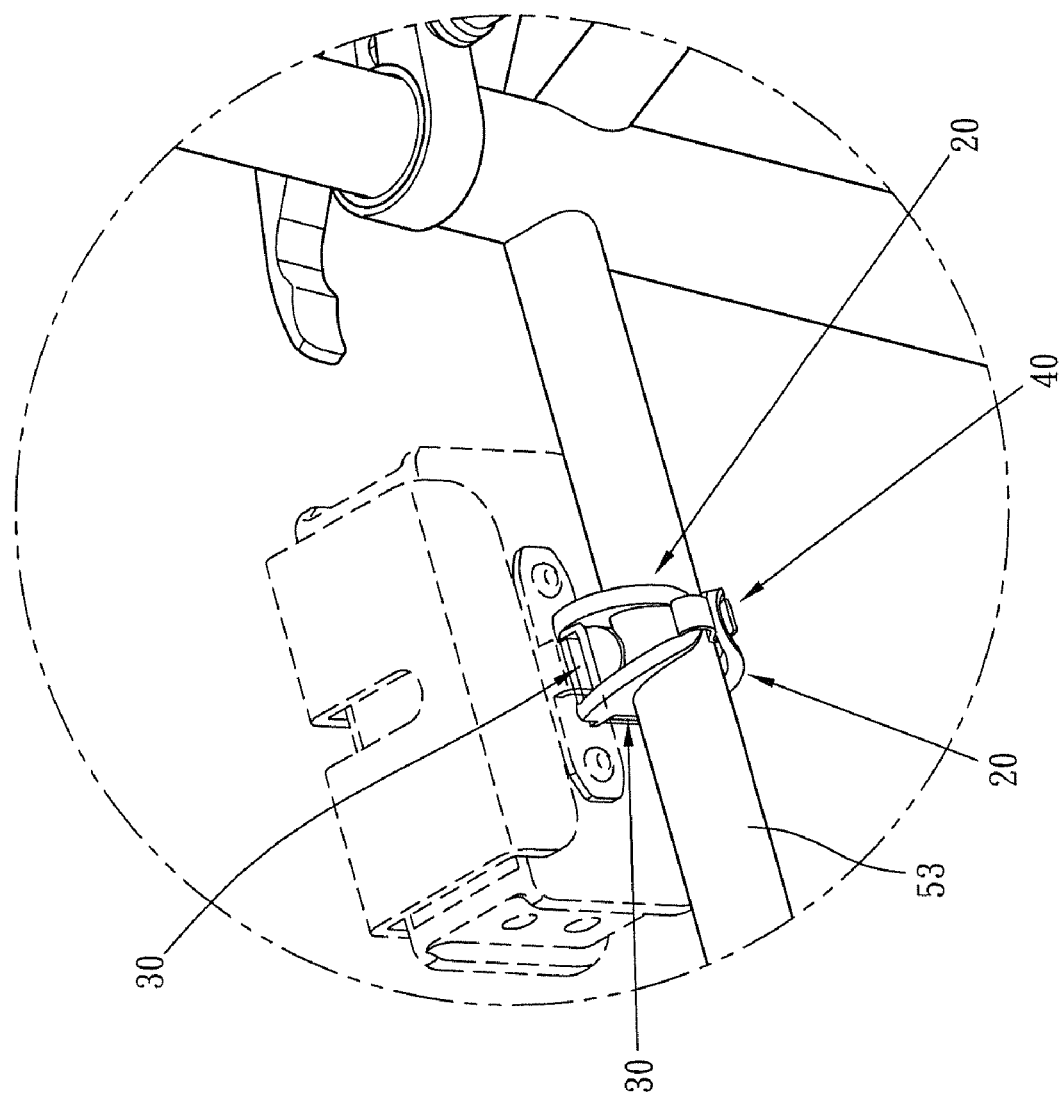
FIG. 12 shows that a bag is connected to the accessory connection member of the present invention on the top tube of the bicycle frame.

As shown in FIG. 12, the connection member is used to connect a bag to the top tube 53, the match surface 12 is first matched to the top tube 53 and the two fastening members 20 are pulled and the S-shaped hook 40 hooks the two sections 21, 22 of the two fastening members 20 to secure the connection member to the top tube 53. The part with the bag usually includes an L-shaped insertion which is then inserted into the space 30 to connect the speed meter to the handlebar 51.

The connection member uses resilient base 10 and two fastening members 20 to conveniently connect to the bicycle frame, and an S-shaped hook 40 hooks the two sections 21, 22 of the fastening member 20 to secure the connection member. The existed part with an L-shaped insertion can be easily inserted into the space 30 of the connection member to be attached to the bicycle 50.

While we have shown and described the embodiment in accordance with the present invention, it should be clear to those skilled in the art that further embodiments may be made without departing from the scope of the present invention.

What is claimed is:

1. A bicycle accessory connection member comprising:
   a base having a planar contact surface defined in one side thereof and a recessed and curved match surface defined in the other side of the base;
   two elongate fastening members extending two sides of the contact surface and toward a recessed and curved match surface, said fastening members are two enclosed collars;
   an S-shaped hook having two recesses defined in two ends thereof and said two fastening members are engaged with said two recesses respectively, and
   a space defined through the base.

2. The connection member as claimed in claim 1, wherein the fastening members integrally extend from the body and both of the body and the fastening members are made by resilient material.

3. The connection member as claimed in claim 1, wherein the contact surface of the body is adapted to be connected with an accessory part and the recessed and curved match surface is adapted to be matched with the bicycle frame.

\* \* \* \* \*